United States Patent
Weik et al.

(10) Patent No.: US 12,059,697 B2
(45) Date of Patent: Aug. 13, 2024

(54) HIGH-PRESSURE WASHER AND METHOD FOR ASSEMBLY OF A HIGH-PRESSURE WASHER

(71) Applicant: Andreas Stihl AG & Co. KG, Waiblingen (DE)

(72) Inventors: Matthias Weik, Waiblingen (DE); Christopher Tost, Auenwald (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 116 days.

(21) Appl. No.: 17/073,363

(22) Filed: Oct. 18, 2020

(65) Prior Publication Data

US 2021/0121907 A1    Apr. 29, 2021

(30) Foreign Application Priority Data

Oct. 24, 2019   (EP) .................................... 19205178

(51) Int. Cl.
| | | |
|---|---|---|
| *B05B 15/14* | (2018.01) | |
| *B05B 15/62* | (2018.01) | |
| *B08B 3/02* | (2006.01) | |
| *B05B 9/04* | (2006.01) | |

(52) U.S. Cl.
CPC .............. *B05B 15/62* (2018.02); *B05B 15/14* (2018.02); *B08B 3/026* (2013.01); *B05B 9/0403* (2013.01)

(58) Field of Classification Search
CPC ....... B05B 15/62; B05B 15/14; B05B 9/0403; B05B 3/026

USPC .......................................................... 239/146
See application file for complete search history.

(56) References Cited

U.S. PATENT DOCUMENTS

| 2,800,548 | A | | 7/1957 | Stary | |
|---|---|---|---|---|---|
| 3,392,548 | A | | 7/1968 | Meyer | |
| 4,699,178 | A | * | 10/1987 | Washkewicz | ........... E21B 34/16 |
| | | | | | 87/9 |
| 4,898,212 | A | * | 2/1990 | Searfoss | ............... F16L 11/088 |
| | | | | | 138/124 |
| 5,395,052 | A | * | 3/1995 | Schneider | ............... B08B 3/026 |
| | | | | | 239/152 |
| 5,413,147 | A | * | 5/1995 | Moreiras | ............. F16L 25/0036 |
| | | | | | 285/259 |
| 5,979,788 | A | | 11/1999 | Rancourt et al. | |
| 2010/0229959 | A1 | | 9/2010 | Boyer | |
| 2011/0274570 | A1 | | 11/2011 | Groeger et al. | |
| 2012/0216890 | A1 | | 8/2012 | Nathan et al. | |
| 2013/0111697 | A1 | | 5/2013 | Betcher et al. | |
| 2013/0343924 | A1 | | 12/2013 | Maier et al. | |

FOREIGN PATENT DOCUMENTS

| DE | 7203943 | 4/1972 |
|---|---|---|
| DE | 299 00 463 | 3/2000 |
| DE | 20 2004 002 987 | 4/2004 |
| DE | 10 2007 021 381 | 11/2007 |
| DE | 10 2007 018 248 | 10/2008 |

(Continued)

*Primary Examiner* — Chee-Chong Lee
(74) *Attorney, Agent, or Firm* — Gudrun E. Huckett (57) ABSTRACT

A high-pressure washer has a housing and an actuator rotatably supported about an actuator rotation axis. A control element is arranged rotatably at the housing and is provided to control the actuator. The control element and the actuator are fixedly connected to each other for joint rotation by one or more universal joints.

17 Claims, 7 Drawing Sheets

(56) References Cited

FOREIGN PATENT DOCUMENTS

| | | |
|---|---|---|
| DE | 10 2008 012 193 | 9/2009 |
| DE | 10 2008 051 160 | 12/2009 |
| JP | S52-89642 | 7/1977 |
| JP | S53-128850 | 10/1978 |
| WO | 91/04804 | 4/1991 |
| WO | 2006/099954 | 9/2006 |
| WO | 2013/123967 | 8/2013 |
| WO | 2014/000824 | 1/2014 |
| WO | 2016/102074 | 6/2016 |
| WO | 2019/034251 | 2/2019 |

* cited by examiner

HIGH-PRESSURE WASHER AND METHOD FOR ASSEMBLY OF A HIGH-PRESSURE WASHER

BACKGROUND OF THE INVENTION

The invention relates to a high-pressure washer comprising a control element that is rotatably arranged at a housing of the high-pressure washer for controlling an actuator that is rotatable about an actuator rotation axis. Furthermore, the invention relates to a method for assembly of a high-pressure washer of the aforementioned kind.

US 2013/0343924 discloses a high-pressure cleaner with a turn knob. By means of the turn knob, an actuator can be rotated. The rotation axes of the turn knob and of the actuator are arranged coaxially relative to each other.

The invention has the object to further develop a high-pressure washer of the aforementioned kind in such a way that a displaced arrangement of the control element and the actuator relative to each other is possible.

The invention has furthermore the object to provide a method for assembly of a high-pressure washer with a control element and an actuator, wherein the control element and the actuator are to be connected fixedly to each other for joint rotation by means of at least one universal joint.

SUMMARY OF THE INVENTION

In accordance with the invention, this is achieved in regard to the high-pressure washer in that the control element and the actuator are connected to each other for joint rotation by means of at least one universal joint.

In accordance with the invention, this is achieved in regard to the method in that the control element and the actuator are connected to each other for joint rotation by means of at least one universal joint, wherein the component group of control element and connecting member is first inserted in the mounting state through an opening in the housing of the high-pressure washer, wherein subsequently the connecting member of the component group, by guiding the component group via the control element, is inserted into the actuator, wherein then the control element is pushed against the connecting member that is supported at the actuator so that thereby the component group is transferred from the mounting state into the state of use, and wherein finally the control element is secured at the housing of the high-pressure washer.

The invention provides that the control element and the actuator are connected to each other for joint rotation by at least one universal joint. In this way, a displaced or offset arrangement of control element and actuator relative to each other is possible. The rotation axes of the control element end of the actuator must not be coaxially arranged relative to each other but can be positioned at a slant to each other. In this way, the actuator can move relative to the control element and an actuation of the actuator by means of the control element remains possible. This can be advantageous, for example, when the actuator is secured at a vibrating component of the high-pressure washer such as a pump, for example.

Advantageously, the at least one universal joint permits a movement of the actuator relative to the control element in the direction of the actuator rotation axis. In this way, the component group of control element and actuator can bridge various distances. Also, it is possible to displace the two endpoints of the control element and of the actuator relative to each other in two planes that are extending parallel to each other and, at the same time, enable an actuation of the actuator by means of the control element.

In an advantageous further embodiment of the invention, it is provided that the control element and the actuator are connected fixedly to each other for joint rotation by means of two universal joints. In particular, the control element and the actuator are arranged relative to each other at a distance measured in the direction of the actuator rotation axis. Due to the use of two universal joints, the actuator rotation axis of the actuator and a control rotation axis of the control element can be arranged displaced relative to each other but can be arranged also parallel to each other. Moreover, it is possible to arrange the actuator relative to the control element, in particular in a direction perpendicular to the control rotation axis, without having to tilt the control element and the actuator relative to each other in this context.

Expediently, a connecting member is arranged between the control element and the actuator. In particular, the two universal joints are a first universal joint and a second universal joint. Advantageously, the first universal joint is embodied between the control element and the connecting member and the second universal joint is embodied between the actuator and the connecting member.

Expediently, the connecting member comprises two control joint pins. Advantageously, the control element comprises for each control joint pin at least one control receiving slot that is open in respect to the actuator rotation axis toward to the actuator and is configured to receive the respective control joint pin. In this way, the control joint pins can be supported in a simple manner. In this way, the first universal joint can be configured in a simple manner.

Expediently, the connecting member comprises two actuator joint pins. Advantageously, the actuator comprises for each actuator joint pin at least one actuator receiving slot that is open in the direction of the actuator rotation axis toward the control element and is configured to receive the respective actuator joint pin. In this way, the actuator joint pins can be supported in a simple manner. In this way, the second universal joint can be configured in a simple manner.

In an advantageous embodiment of the invention, it is provided that the control element and the actuator are spaced apart from each other such that the connecting member between the control element and the actuator is secured in that the control joint pins are arranged inside the control receiving slots and in that the actuator joint pins are arranged inside the actuator receiving slots. In this way, the connecting member is held in a simple way between the control element and the actuator. At the same time, the distance can be selected such that the connecting member between the control element and the actuator has clearance for movement.

The control element and the connecting member together form a component group. In an advantageous further embodiment of the invention, it is provided that the component group comprises a state of use in which the control element and the connecting member are movable relative to each other and that the component group has a mounting state in which the first universal joint by means of a releasable locking connection is locked between the control element and the connecting member. In this way, a comfortable installation of the component group in the high-pressure washer is possible. Accordingly, upon assembly of the high-pressure washer, the component group in the mounting state can be connected in a simple way with the actuator and subsequently transferred into the state of use. Since the releasable locking connection is locked between the control element and the connecting member in the mounting state, the connecting member can be positioned at the actuator by being guided by means of the control element. In this context, it is possible that the component group is held only by the control element. Due to the locking action of the locking connection, the connecting member follows the movement of the control element as if it were rigidly connected to the control element.

Advantageously, the component group in the mounting state is locked such that the control rotation axis of the control element and a longitudinal axis along which the connecting member is extending are positioned coaxially to each other. In this way, a particularly simple guiding of the connecting member by means of the control element is possible.

The first universal joint comprises in particular two pivot axes which extend through one of the two control joint pins, respectively. Expediently, the locking connection prevents in the mounting state a pivoting action of the connecting member relative to the control element about the two pivot axes of the first universal joint. In particular, the locking connection is comprised of a first locking means at the control element and a second locking means at the connecting member. Advantageously, it is provided that the first locking means are projections at the rim of the control receiving slot between which the second locking means of the connecting member, embodied as engagement projections, is held by clamping action in the mounting state.

In particular, it is provided that, for accommodating a control joint pin, two control receiving slots are provided for each control joint pin and are arranged in a wall of the control element surrounding a control rotation axis circumferentially. Advantageously, in the circumferential direction about the control rotation axis, first and second projections are alternatingly provided at the rim of the control receiving slots, wherein the first projections prevent a movement of the connecting member in the direction of the control rotation axis away from the control element and the second projections prevent a movement of the connecting member in the direction of the control rotation axis toward the control element.

Preferably, the locking connection is resilient in such a way that the component group, by pushing the control element in the direction of the control rotation axis toward the connecting member, can be transferred from the mounting state into state of use. In this way, a transfer of the component group from the mounting state into the state of use is possible in a quick and simple way.

In particular, the actuator is provided for actuation of a component of the high-pressure washer that is moveable relative to the housing thereof. In particular, upon arrangement of the actuator at a component of the high-pressure washer which is moveable relative to the housing, the universal joint according to the invention is of great advantage. The high-pressure washer can be designed therefore in such a way that the control element is designed to be non-slidable relative to the housing of the high-pressure washer but an actuator which is arranged at the moveable component of the high-pressure washer can still be actuated with this control element.

In a particularly beneficial configuration of the invention, the component of the high-pressure washer is resiliently supported by means of a damping element relative to the housing. In this way, movements of the component can be dampened. In particular, it can be provided that the component is a pump with a motor. Expediently, the actuator is provided for actuating a pressure regulation of the pump. Advantageously, the actuator is arranged at the pump.

The method according to the invention for assembly of a high-pressure washer comprising a component group, wherein the component group comprises a state of use in which the control element and the connecting member are movable relative to each other and further comprises a mounting state in which the first universal joint is locked by means of a releasable locking connection between the control element and the connecting member, provides that the component group of control element and connecting member is first inserted in the mounting state through an opening in the housing of the high-pressure washer. Subsequently, the connecting member of the component group is inserted into the actuator by guiding the component group by means of the control element. Then, the control element is pushed against the connecting member which is supported at the actuator so that thereby the component group is transferred from the mounting state into the state of use. Subsequently, the control element is secured at the housing of the high-pressure washer. By means of this assembly method, the connecting member can be connected in a simple way quickly and comfortably to the actuator. This can be done without tools. In the state of use of the component group, the connecting member and the control element are connected already by means of the first universal joint; no separate assembly step is required to achieve this.

DESCRIPTION OF THE PREFERRED EMBODIMENTS

Figure 1:
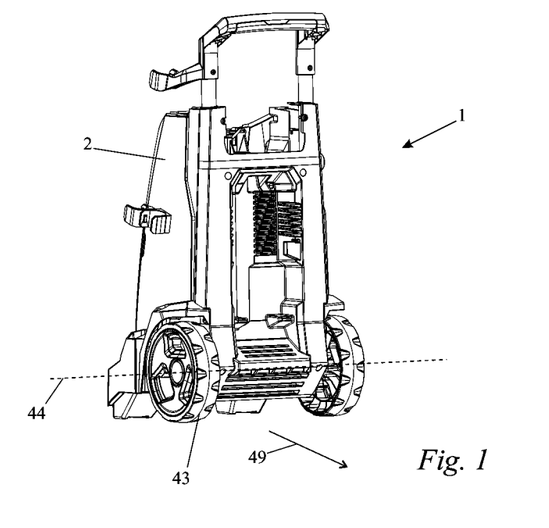
FIG. 1 is a perspective illustration of a high-pressure washer.

FIG. 1 shows the high-pressure washer 1 with a housing 2. The high-pressure washer 1 comprises wheels 43 that are rotatable about a rotation axis 44. The high-pressure washer 1 can be pulled on the wheels 43 in a pulling direction 49. The pulling direction 49 extends perpendicularly to the rotation axis 44.

Figure 2:
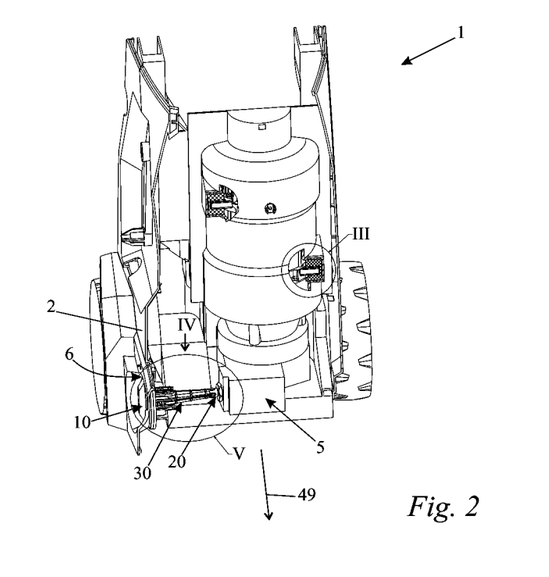
FIG. 2 is a perspective, partially sectioned illustration of the high-pressure washer according to FIG. 1.

As illustrated in FIG. 2, the housing 2 comprises an opening 6 that is laterally arranged relative to the pulling direction 49. A control element 10 is arranged in the opening 6. The control element 10 is supported rotatably in the opening 6. The control element 10 serves for operating a rotatable actuator 20. In the partially sectioned illustration of FIG. 2, it can be seen that the high-pressure washer 1 has a component movable relative to the housing 2. The movable component is a pump 5. The actuator 20 serves for actuating the pump 5. The pump 5 comprises a motor, not illustrated. The actuator 20 serves for actuating a pressure regulation of the pump 5. The actuator 20 is arranged at the pump 5.

Figure 3:
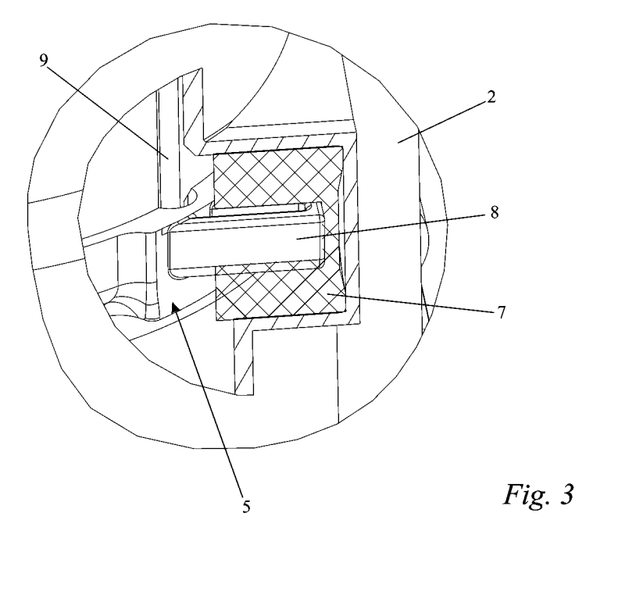
FIG. 3 is a detail that is identified by III in FIG. 2.

As illustrated in FIG. 3, the pump 5 is resiliently supported by means of a damping element 7 relative to the housing 2. For this purpose, the pump 5 has a bearing projection 8. The bearing projection 8 protrudes past a base member 9 of the pump 5. The bearing projection 8 is supported by means of the damping element 7 at the housing 2. The damping element 7 is resilient. In operation of the pump 5, the damping element 7 dampens the transmission of vibrations from the pump 5 to the housing 2.

Figure 4:
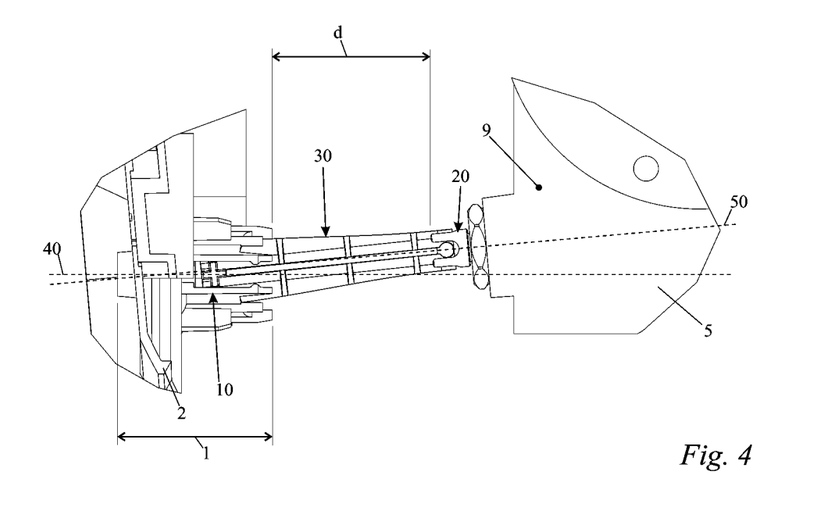
FIG. 4 is a plan view of the control element, the connecting member, and the actuator in FIG. 2 in the direction of the arrow identified by IV in FIG. 2.

As illustrated in FIG. 4, the control element 10 is rotatable about a control rotation axis 40. The control element 10 is supported in the housing 2. The control element 10 and the actuator 20 are arranged spaced apart from each other at a distance d measured in the direction of the control rotation axis 40. The control element 10 comprises a length L which is measured in the direction of the control rotation axis 40. The distanced between the control element 10 and the actuator 20 is larger than the length L of the control element 10.

In operation of the pump 5, the pump 5 produces vibrations which lead to a movement of the pump 5 relative to the housing 2. The actuator 20 is rotatably supported at the base member 9 of the pump 5. The actuator 20 is rotatable about the actuator rotation axis 50. Upon vibration of the base member 9 of the pump 5, the actuator 20 also vibrates. In operation of the pump 5, the actuator 20 moves relative to the control element 10. Due to the distance between the control element 10 and the actuator 20 and the vibrations of the actuator 20 during operation of the pump 5, a rigid connection between the control element 10 and the actuator 20 can be realized only with difficulty. As illustrated in FIG. 4, the control element 10 and the actuator 20 are connected to each other by a connecting member 30.

Figure 5:
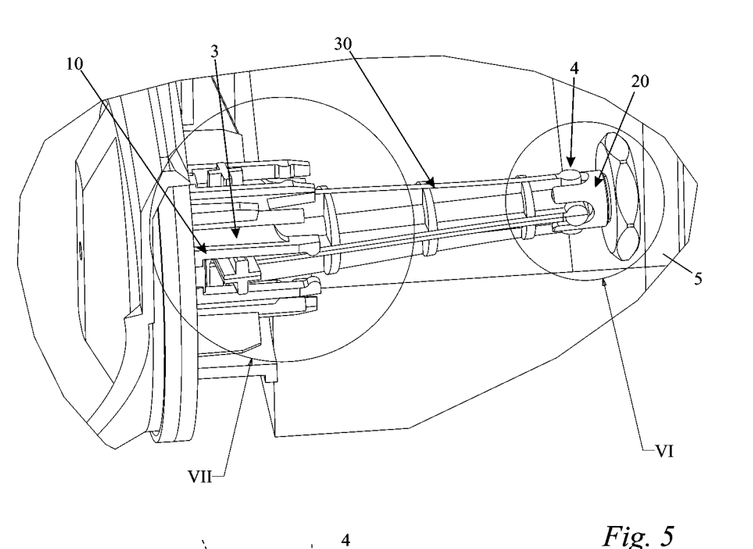
FIG. 5 is a detail identified by V in FIG. 2.

As illustrated in FIG. 5, the control element 10 and the actuator 20 are connected fixedly to each other for joint rotation by means of at least one universal joint 3, 4. In the embodiment, the control element 10 and the actuator 20 are connected fixedly to each other for joint rotation by two universal joints 3 and 4. Between the control element 10 and the connecting member 30, a first universal joint 3 is formed. Between the actuator 20 and the connecting member 30, a second universal joint 4 is formed.

Figure 6:
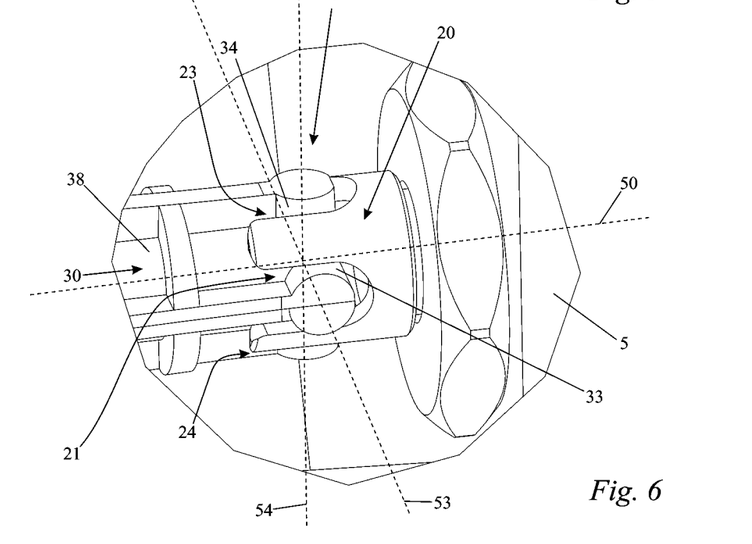
FIG. 6 is a detail identified by VI in FIG. 5.
Figure 10:
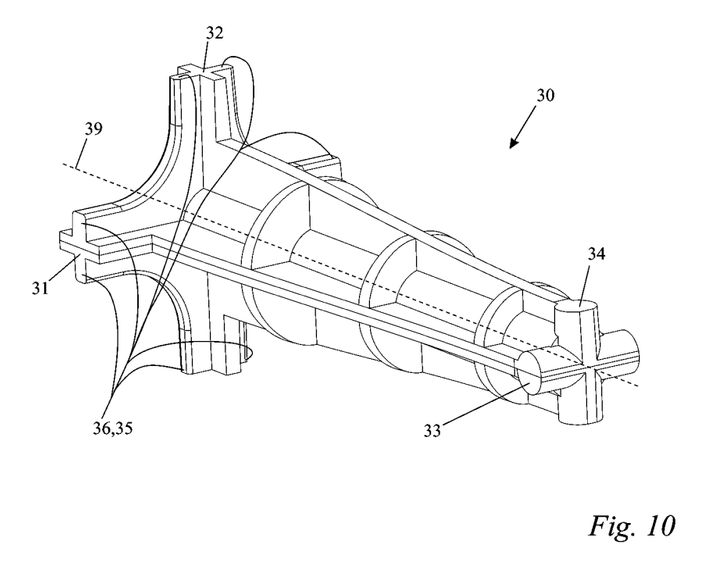
FIG. 10 is a perspective illustration of the connecting member of FIGS. 8 and 9.

The second universal joint 4 is illustrated in detail in FIG. 6. The connecting member 30 comprises two actuator joint pins (pivot pins) 33 and 34. The actuator joint pins 33 and 34 are arranged at an end of the connecting member 30 which is facing away from the control element 10. The first actuator joint pin 33 is oriented perpendicularly to the second actuator joint pin 34. This is also illustrated in FIG. 10. As can be seen in FIG. 6, the first actuator joint pin 33 is pivotably supported about a first actuator pivot axis 53 in the actuator 20. The second actuator joint pin 34 is pivotably supported about a second actuator pivot axis 54 in the actuator 20. The first actuator joint pin 33 extends along the first actuator pivot axis 53. The second actuator joint pin 34 extends along the second actuator pivot axis 54. The actuator joint pins 33 and 34 are fixed components of the connecting member 30. The actuating joint pins 33 and 34 are formed as one piece together with the main body 38 of the connecting member 30. The first actuator pivot axis 53 and the second actuator pivot axis 54 are always perpendicular to each other.

The actuator 20 comprises for each actuator joint pin 33, 34 at least one actuator receiving slot 21, 22, 23, 24 for receiving the respective actuator joint pin 33, 34. The at least one actuator receiving slot 21, 22, 23, 24 is open in the direction of the actuator rotation axis 50 toward the control element 10. The at least one actuator receiving slot 21, 22, 23, 24 is U-shaped. The longitudinal direction of the U extends in the direction of the actuator rotation axis 50. In the embodiment, the actuator 20 comprises the first actuator receiving slot 21 and the second actuator receiving slot 22 (not illustrated in FIG. 6) for the first actuator joint pin 33. The first actuator receiving slot 21 and the second actuator receiving slot 22 extend in a common plane. In the embodiment, the common plane of the first actuator receiving slot 21 and of the second actuator receiving slot 22 is a symmetry plane of the first actuator receiving slot 21 and of the second actuator receiving slot 22. The first actuator receiving slot 21 and the second actuator receiving slot 22 are positioned opposite each other with respect to the actuator rotation axis 50.

For the second actuator joint pin 34, the actuator 20 comprises the third actuator receiving slot 23 and the fourth actuator receiving slot 24. The third actuator receiving slot 23 and the fourth actuator receiving slot 24 are positioned in a common plane. In the embodiment, the common plane of the third actuator receiving slot 23 and of the fourth actuator receiving slot 24 is a symmetry plane of the third actuator receiving slot 23 and of the fourth actuator receiving slot 24. The plane of the first actuator receiving slot 21 and of the second actuator receiving slot 22 and the plane of the third actuator receiving slot 23 and of the fourth actuator receiving slot 24 are positioned perpendicularly to each other. The third actuator receiving slot 23 and the fourth actuator receiving slot 24 are positioned opposite each other with respect to the actuator rotation axis 50.

The first actuator joint pin 33 is inserted into the first actuator receiving slot 21 and into the second actuator receiving slot 22. The first actuator pivot axis 53 is positioned in the plane in which the first actuator receiving slot 21 and the second actuator receiving slot 22 are extending. The second actuator joint pin 34 is inserted into the third actuator receiving slot 23 and into the fourth actuator receiving slot 24. The second actuator pivot axis 54 is positioned in the plane in which the third actuator receiving slot 23 and the fourth actuator receiving slot 24 are extending. The actuator receiving slots 21, 22, 23, 24 are open toward the control element 10.

The second universal joint 4 comprises a first joint element and a second joint element, wherein the second joint element comprises the actuator joint pins 33 and 34 and wherein the first joint element comprises the actuator receiving slots 21, 22, 23, and 24 as a receptacle for the actuator joint pins 33, 34 of the second joint element. The second universal joint 4 permits a movement of the actuator 20 relative to the control element 10 in the direction of the actuator rotation axis 50. The second universal joint 4 permits a movement of the connecting member 30 relative to the actuator 20 in the direction of the actuator rotation axis 50. In this context, the first actuator joint pin 33 can be displaced in the actuator receiving slots 21 and 22 in the plane which is defined by the actuator receiving slots 21 and 22. In doing so, also the first actuator pivot axis 53 is displaced in the plane of the actuator receiving slots 21 and 22, i.e., the plane, defined by the actuator receiving slots 21 and 22 and stationary relative to the actuator receiving slots 21 and 22, is displaced relative to the first actuator pivot axis 53 so that the first actuator pivot axis 53 is moved to a different location in the plane which is defined by the actuator receiving slots 21 and 22. Also, a displacement of the second actuator joint pin 34 in the actuator receiving slots 23 and 24 is possible.

In an analog manner, the second actuator pivot axis 54 is displaced in the actuator receiving slots 23 and 24. The second actuator pivot axis 54 and the plane defined by the actuator receiving slots 23 and 24 are displaced relative to each other, wherein the second actuator pivot axis 54 is always positioned within the plane that is defined by the actuator receiving slots 23 and 24. Due to these displacement possibilities, the second universal joint 4 functions without problems even in case of vibrations or relative movements of the actuator 20. In this way, the distance which is illustrated in FIG. 4 between the control element 10 and the actuator 20 can be enlarged or decreased without the possibility of controlling the actuator 20 by means of the control element 10 failing.

Figure 7:
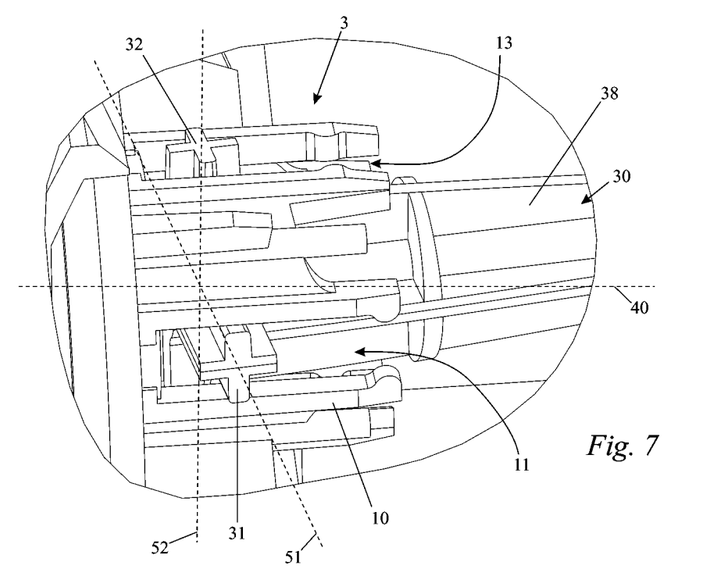
FIG. 7 is a detail identified by VII in FIG. 5.
Figure 11:
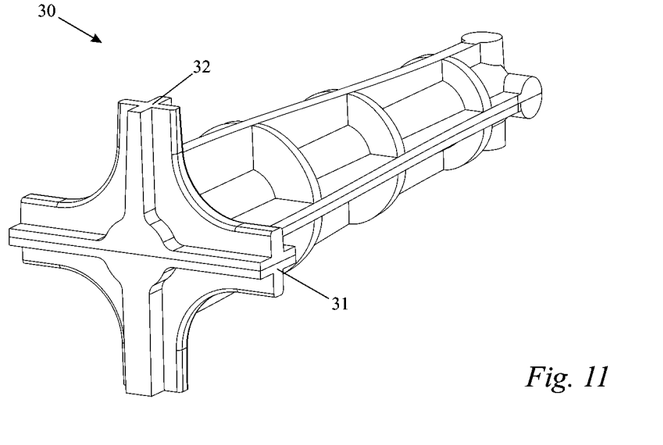
FIG. 11 is another perspective illustration of the connecting member of FIGS. 8 and 9.

The first universal joint 3 is illustrated in detail in FIG. 7. The connecting member 30 comprises two control joint pins (pivot pins) 31 and 32. The control joint pins 31 and 32 are arranged at the end of the connecting member 30 which is facing away from the actuator 20. The first control joint pin 31 is oriented perpendicularly to the second control joint pin 32. This is also illustrated in FIG. 11. As can be seen in FIG. 7, the first control joint pin 31 is pivotably supported about the first control pivot axis 51 in the control element 10. The second control joint pin 32 is pivotably supported about a second control pivot axis 52 in the control element 10. The first control joint pin 31 extends along the first control pivot axis 51. The second control joint pin 32 extends along the second control pivot axis 52. The control joint pins 31 and 32 are a fixed component of the connecting member 30. The control joint pins 31 and 32 are formed as one piece together with the main body 38 of the connecting member 30. The first control pivot axis 51 and the second control pivot axis 52 are thus always perpendicular to each other.

The control element 10 comprises for each control joint pin 31, 32 at least one control receiving slot 11, 12, 13, 14 for receiving the respective control joint pin 31, 32. The at least one control receiving slot 11, 12, 13, 14 is open in the direction of the control rotation axis 40 toward the control element 20. The at least one control receiving slot 11, 12, 13, 14 is U-shaped. The longitudinal direction of the U extends in the direction of the control rotation axis 40. In the embodiment, the control element 10 comprises the first control receiving slot 11 and the second control receiving slot 12 (not illustrated in FIG. 7) for the first control joint pin 31.

The first control receiving slot 11 and the second control receiving slot 12 extend in a common plane. In the embodiment, the common plane of the first control receiving slot 11 and of the second control receiving slot 12 is a symmetry plane of the first control receiving slot 11 and of the second control receiving slot 12. The first control receiving slot 11 and the second control receiving slot 12 are positioned opposite each other in respect to the control rotation axis 40. The control element 10 comprises the third control receiving slot 13 and the fourth control receiving slot 14 for the second control joint pin 32. The third control receiving slot 13 and the fourth control receiving slot 14 are positioned in a common plane. In the embodiment, the common plane of the third control receiving slot 13 and of the fourth control receiving slot 14 is a symmetry plane of the third control receiving slot 13 and of the fourth control receiving slot 14. The plane of the first control receiving slot 11 and of the second control receiving slot 12 and the plane of the third control receiving slot 13 and of the fourth control receiving slot 14 are positioned perpendicularly to each other. The third control receiving slot 13 and the fourth control receiving slot 14 are positioned opposite each other in respect to the control rotation axis 40.

The first control joint pin 31 is inserted into the first control receiving slot 11 and into the second control receiving slot 12. The first control pivot axis 51 is positioned in the plane in which the first control receiving slot 11 and the second control receiving slot 12 are extending. The second control joint pin 32 is inserted into the third control receiving slot 13 and into the fourth control receiving slot 14. The second control pivot axis 52 is positioned in the plane in which the third control receiving slot 13 and the fourth control receiving slot 14 are extending. The control receiving slots 11, 12, 13, and 14 are open toward the actuator 20.

The first universal joint 3 comprises the control joint pins 31 and 32 and the control receiving slots 11, 12, 13, and 14. The first universal joint 3 permits a movement of the actuator 20 relative to the control element 10 in the direction of the control rotation axis 40. The first universal joint 3 permits a movement of the connecting member 30 relative to the control element 10 in the direction of the control rotation axis 40. In this context, the first operating joint axis 31 can be displaced in the control receiving slots 11 and 12 in the plane which is defined by the control receiving slots 11 and 12. In this context, the first control pivot axis 51 is also displaced in the plane of the control receiving slots 11 and 12, i.e., the plane, defined by the control receiving slots 11 and 12 and stationary relative to the control receiving slots 11 and 12, is displaced relative to the first control pivot axis 51 so that the first control pivot axis 51 is moved to a different location in the plane which is defined by the control receiving slots 11 and 12. Also, a displacement of the second control joint pin 32 in the control receiving slots 13 and 14 is possible.

In analogy, the second control pivot axis 52 is displaced in the control receiving slots 13 and 14. The second control pivot axis 52 and the plane which is defined by the control receiving slots 13 and 14 are displaced in this context relative to each other wherein the second control pivot axis 52 is always positioned in the plane defined by the control receiving slots 13 and 14. Due to these displacement possibilities, the first universal joint 3 functions without problem even in case of vibrations or relative movements of the actuator 20 or of the connecting member 30. Therefore, the distance illustrated in FIG. 4 between the control element 10 and the actuator 20 can be enlarged or decreased without the possibility of controlling the actuator 20 by means of the control element 10 failing.

As illustrated in FIG. 4, the distance between the control element 10 and the actuator 20 is such that the connecting member 30 is held between the connecting element 10 and the actuator 20 in that the control joint pins 31 and 32 are arranged in the control receiving slots 11, 12, 13, and 14 and in that the actuator joint pins 33 and 34 are arranged in the actuator receiving slots 21, 22, 23, and 24. The distance d between the control element 10 and the actuator 20 is selected such that a relative movement of the actuator 20 relative to the control element 10 in the direction of the control rotation axis 40 is possible within a certain movement range and that at the same time the control joint pins 31 and 32 cannot slide out of the control receiving slots 11, 12, 13, and 14 and the actuator joint pins 33 and 34 cannot slide out of the actuator receiving slots 21, 22, 23, and 24. In this way, the compensation of vibration movements of the pump 5 is possible by the universal joints 3 and 4. At the same time, control of the actuator 20 by the control element 10 is possible.

The movement range (clearance) is so large that the maximally possible distance between the control element 10 and the actuator 20, measured in the direction of the control rotation axis 40, amounts to at least 110% of the minimally possible distance between the control element 10 and the actuator 20, measured in the direction of the control rotation axis 40. The movement range is so large that the maximally possible distance between the control element 10 and the actuator 20 amounts to at most 130% of the minimally possible distance between the control element 10 and the actuator 20.

Figure 8:
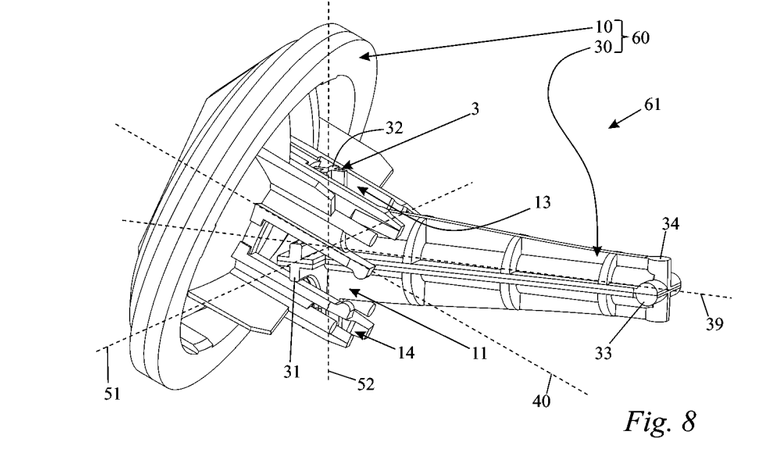
FIG. 8 is a perspective illustration of a component group comprised of the control element and the connecting member in a state of use.

FIG. 8 shows the control element 10 and the connecting member 30. The connecting member 30 is inserted into the control element 10. The connecting member 30 is inserted with its control joint pins 31 and 32 into the control receiving slots 11, 12, 13, and 14 of the control element 10. The control element 10 and the connecting member 30 form a component group 60. In FIG. 8, the component group 60 is in a state of use 61. In the state of use 61, the control element 10 and the connecting member 30 are movable relative to each other. The connecting member 30 comprises a longitudinal axis 39. The connecting member 30 extends along the longitudinal axis 39. In the state of use 61, the longitudinal axis 39 of the connecting member 30 can be tilted relative to the control rotation axis 40 of the control element 10. In the state of use 61, pivoting of the connecting member 30 about at least one of the control pivot axes 51 and 52 is possible.

Figure 9:
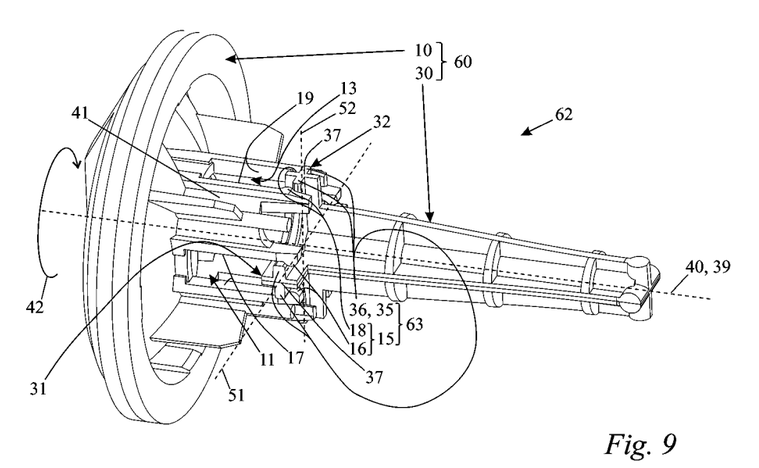
FIG. 9 is a perspective illustration of the component group of FIG. 8 in a mounting state.

FIG. 9 shows the component group 60 in a mounting state 62. In the mounting state 62, the first universal joint 3 is locked by means of a releasable locking connection 63. The locking connection 63 in the mounting state 62 is formed between the control element 10 and the connecting member 30. In the mounting state 62, the control element 10 and the connecting member 30 form a rigid unit. In the mounting state 62, pivoting of the connecting member 30 relative to the control element 10 about one of the control pivot axes 51 or 52 is impossible. In the mounting state 62, the component group 60 is locked such that the control rotation axis 40 of the control element 10 and the longitudinal axis 39 of the connecting member 30 are coaxial to each other. In the mounting state 62, the locking connection 63 prevents pivoting of the connecting member 30 relative to the control element 10 about the two control pivot axes 51 and 52 of the first universal joint 3.

The locking connection 63 is comprised of a first locking means 15 and a second locking means 35. The first locking means 15 is a component of the control element 10. The second locking means 35 is a component of the connecting member 30. In the embodiment, the first locking means 15 comprises a plurality of components. The first locking means 15 are projections 16 and 18 at a rim 17, 19 of the control receiving slots 11, 12, 13, and 14. The first control receiving slot 11 and the second control receiving slot 12 each have a rim 17. The rims 17 of the first control receiving slot 11 and of the second control receiving slot 12 are separately embodied relative to each other. The third control receiving slot 13 and the fourth control receiving slot 14 each have a rim 19. The rims 19 of the third control receiving slot 13 and of the fourth control receiving slot 14 are embodied separate from each other. The rim 17 and the rim 19 each have a substantially U-shaped form. The opening of the U-shape faces the connecting member 30.

Figure 13:
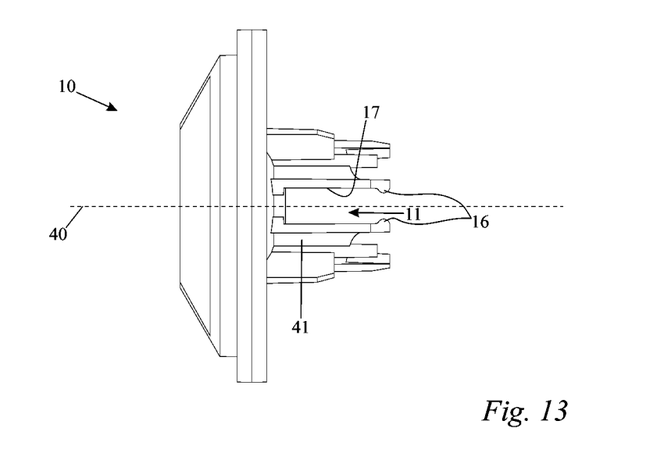
FIG. 13 is a side view of the control element of FIG. 12.

The projections 16 project in a direction perpendicular to the control rotation axis 40 past the rims 17 of the control receiving slots 11 and 12. Each one of the control receiving slots 11 and 12 comprises two projections 16. The two projections 16 of a control receiving slot 11, 12 are positioned opposite each other. This is also illustrated in FIG. 13. The two projections 16 of a control receiving slot 11, 12 are positioned at the same level relative to the direction of the control rotation axis 40.

As illustrated in FIG. 9, the projections 18 are projecting in the direction perpendicular to the control rotation axis 40 past the rims 19 of the control receiving slots 13 and 14. Each of the control receiving slots 13 and 14 comprises two respective projections 18. The projections 18 are positioned opposite each other. The projections 18 are positioned at the same level relative to the direction of the control rotation axis 40.

The second locking means 35 comprises a plurality of components. The second locking means 35 comprises engagement projections 36. The engagement projections 36 are a component of the two control joint pins 31 and 32. The control joint pins 31 and 32 each have a base body 37. The engagement projections 36 are projecting in the direction perpendicular to the longitudinal axis 39 of the connecting member 30 past the base body 37 of the control joint pins 31 and 32.

In the mounting state 62, the first locking means 15 holds by clamping action the second locking means 35. In the mounting state 62, the engagement projections 36 of the connecting member 30 are held by clamping action between the projections 16 and 18 at the rim 17, 19 of the control receiving slots 11, 12, 13, and 14.

The control element 10 comprises a circumferential wall 41 circumferentially extending about the control rotation axis 40. The control receiving slots 11, 12, 13, and 14 are arranged in the wall 41. In the circumferential direction 42 about the control rotation axis 40, at the rim 17, 19 of the control receiving slots 11, 12, 13, 14, alternatingly first projections 16 are provided which in the mounting state 62 prevent a movement of the connecting member 30 in the direction of the control rotation axis 40 away from the control element 10 and second projections 18 are provided which in the mounting state 62 prevent a movement of the connecting member 30 in the direction of the control rotation axis 40 toward the control element 10. As illustrated in FIG. 9, the projections 16 at the rim 17 of the first control receiving slot 11 prevent a movement of the engagement projections 36 of the first control joint pin 31 in the direction away from the control element 10. The projections 18 at the rim 19 of the third control receiving slot 13 prevent a movement of the engagement projections 36 of the second control joint pins 32 in the direction toward the control element 10.

Figure 12:
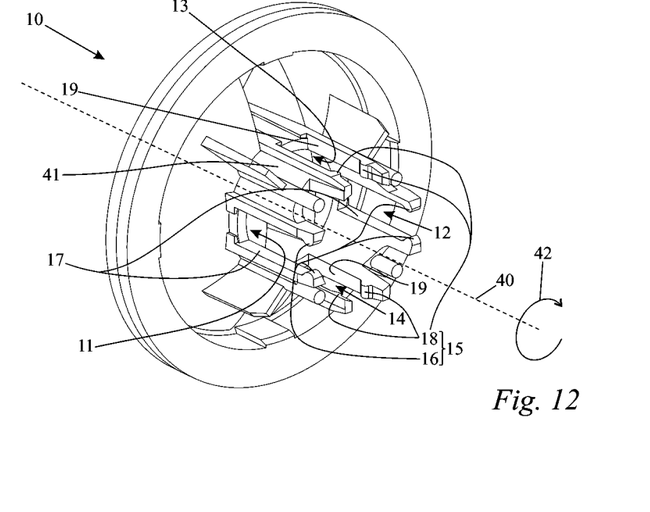
FIG. 12 is a perspective illustration of the control element.

In the mounting state 62 of the component group 60, the connecting member 30 is held by clamping action in respect to the direction of the control rotation axis 40 between the projections 16 of the first control receiving slot 11 and the projections 18 of the third control receiving slot. The projections 16 of the first control receiving slot 11 and the projections 18 of the third control receiving slot 13 are arranged at a distance relative to each other with respect to the direction of the control rotation axis 40; this distance corresponds to a width of the engagement projections 36 of the control joint pins 31 and 32 that is measured in the direction of the longitudinal axis 39 of the connecting member 30. The same holds true for the projections 16 of the second control receiving slot 12 and the projections 18 of the fourth control receiving slot 14 that are illustrated in FIG. 12.

The locking connection 63 is resilient in such a way that the component group 60 by pressing the control element 10 in the direction of the control rotation axis 40 against the connecting member 30 can be transferred from the mounting state 62 illustrated in FIG. 9 into the state of use illustrated in FIG. 8. The projections 18 which in the mounting state 62 prevent a movement of the connecting member 30 in the direction toward the control element 10 are rounded at their side which is facing the connecting member 30 in the direction of the control rotation axis 40. In this way, the control receiving slots 11 and 12 in the mounting state 62 are widened when the control element 10 is pushed against the connecting member 30 in the direction of the control rotation axis 40. The control element 10 is thereby moved closer to the connecting member 30 so that the control joint pins 31 and 32 move deeper into the control receiving slots 11, 12, 13, and 14. In this region of the control receiving slots 11, 12, 13, and 14, the engagement projections 36 of the control joint pins 31 and 32 are no longer clamped between the projections 16 and 18. The locking connection 63 is released and the component group 60 is in the state of use 61.

When assembling the high-pressure washer 1, the control element 10, the connecting member 30, and the actuator 20 must be connected to each other so that the state illustrated in FIG. 5 is reached. For this purpose, the actuator joint pins 33 and 34 illustrated in FIG. 6 must be inserted into the actuator receiving slots 21, 22, 23, and 24 of the actuator 20. For this purpose, the connecting member 30 must be inserted into the comparatively small opening 6 (FIG. 2) in the housing 2 of the high-pressure washer 1. Since the connecting member 30 is shorter than the distance between the housing 2 and the actuator 20, the connecting member 30 must be completely guided through the opening 6 (FIG. 4). In order to avoid the use of a tool or the necessity of great dexterity by the user, the following procedure is followed.

The component group 60 of control element 10 and connecting member 30 is first inserted in the mounting state 62 (FIG. 9) through the opening 6 in the housing 2 of the high-pressure washer 1. Subsequently, the connecting member 30 of the component group 60, while guiding the component group 60 by the control element 10, is inserted into the actuator 20. In doing so, only the control element 10 must be guided by hand. The connecting member 30 follows the movements of the control element 10 due to the locked locking connection 63. In this way, engagement of the actuator receiving slots 21, 22, 23, and 24 of the actuator 20 (FIG. 6) with the actuator joint pins 33 and 34 of the connecting member 30 can be realized quickly, precisely, and in a simple manner. By inserting the connecting member 30 into the actuator 20, the second universal joint 4 is formed. A rotational movement of the connecting member 30 effects a rotational movement of the actuator 20. After the connecting member 30 has been inserted into the actuator 20, the control element 10 is pushed against the connecting member 30 which is supported at the actuator 20 so that thereby the component group 60 is transferred from the mounting state 62 into the state of use 61 (FIG. 8). In this way, the first universal joint 3 is made ready for use. The connecting member 30 is movable relative to the control element 10. A rotational movement of the control element 10 about the control rotation axis 40 causes a rotational movement of the connecting member 30. Subsequently, the control element 10 is secured at the housing 2 of the high-pressure washer 1 (FIG. 2).

Figure 14:
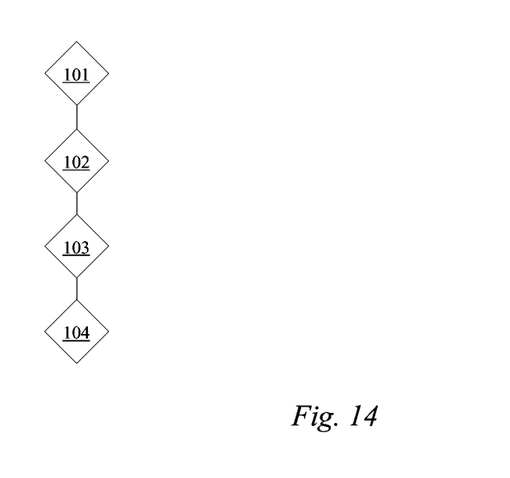
FIG. 14 is a symbolic illustration of the assembly method.

The assembly of the high-pressure washer 1 comprises method steps 101, 102, 103, and 104 symbolically illustrated in FIG. 14. The assembly method begins with the first assembly step 101. The component group 60 of control element 10 and connecting member 30 is in the mounting state 62 (FIG. 9) and is inserted through an opening 6 (FIG. 2) in the housing 2 of the high-pressure washer 1. In the second assembly step 102 (FIG. 14), the connecting member 30 of the component group 60 is inserted into the actuator 20 (FIG. 5) while guiding the component group 60 by means of the control element 10. In the third assembly step 103 (FIG. 14), the control element 10 is pushed against the connecting member 10 which is supported at the actuator 20 so that thereby the component group 60 is transferred from the mounting state 62 (FIG. 9) into the state of use 61 (FIG. 8). In the fourth assembly step 104, the control element 10 is secured at the housing 2 (FIG. 2) of the high-pressure washer 1. The assembly steps 101, 102, 103, and 104 are carried out in the described sequence.

The specification incorporates by reference the entire disclosure of European priority document 19 205 178.7 having a filing date of Oct. 24, 2019.

While specific embodiments of the invention have been shown and described in detail to illustrate the inventive principles, it will be understood that the invention may be embodied otherwise without departing from such principles.

What is claimed is:

1. A high-pressure washer comprising:
a housing;
an actuator rotatably supported about an actuator rotation axis;
a control element arranged rotatably at the housing and configured to control the actuator;
the control element and the actuator fixedly connected to each other for joint rotation by one or more universal joints;
wherein the one or more universal joints include a first universal joint and a second universal joint, wherein the control element and the actuator are arranged at a distance from each other, wherein the distance is measured in a direction of a control rotation axis of the control element, and wherein the control element and the actuator are fixedly connected to each other for joint rotation by the first universal joint and the second universal joint;
a connecting member arranged between the control element and the actuator, wherein the first universal joint is formed between the control element and the connecting member and wherein the second universal joint is formed between the actuator and the connecting member;
wherein the control element and the connecting member form a component group, wherein the component group comprises a state of use, wherein in the state of use the control element and the connecting member are movable relative to each other, wherein the component group further comprises a mounting state, wherein in the mounting state the first universal joint is non-pivotably locked by a releasable locking connection provided between the control element and the connecting member;
wherein the releasable locking connection in the state of use is released such that the control element and the connecting member in the state of use are connected to each other by the first universal joint only such that pivoting of the connecting member relative to the control member is possible.

2. The high-pressure washer according to claim 1, wherein the one or more universal joints are configured to enable a movement of the actuator relative to the control element in a direction of the actuator rotation axis.

3. The high-pressure washer according to claim 1, wherein the connecting member comprises two control joint pins and wherein the control element comprises at least one control receiving slot for each control joint pin of the connecting member to accommodate said control joint pin, wherein the at least one control receiving slot is open in a direction of the actuator rotation axis toward the actuator.

4. The high-pressure washer according to claim 1, wherein the connecting member comprises two actuator joint pins and wherein the actuator comprises at least one actuator receiving slot for each actuator joint pin of the connecting member to accommodate said actuator joint pin, wherein the at least one actuator receiving slot is open in a direction of the actuator rotation axis toward the control element.

5. The high-pressure washer according to claim 4, wherein the connecting member comprises two control joint pins and wherein the control element comprises at least one control receiving slot for each one of the two control joint pins of the connecting member to accommodate each one of the two control joint pins, wherein the at least one control receiving slot is open in the direction of the actuator rotation axis toward the actuator, wherein the control element and the actuator are spaced apart from each other such that the connecting member is held between the control element and the actuator in that each one of the two control joint pins is arranged in the at least one control receiving slot and said actuator joint pin is arranged in the at least one actuator receiving slot.

6. The high-pressure washer according to claim 1, wherein the component group is locked in the mounting state such that the control rotation axis of the control element and a longitudinal axis of the connecting member along which the connecting member extends are coaxial to each other.

7. The high-pressure washer according to claim 1, wherein the first universal joint comprises a first control joint pin and a second control joint pin provided at the connecting member, wherein a first control pivot axis of the first universal joint extends through the first control joint pin and a second control pivot axis of the first universal joint extend through the second control joint pin, and wherein the releasable locking connection in the mounting state prevents pivoting of the connecting member relative to the control element about the first and second control pivot axes of the first universal joint.

8. The high-pressure washer according to claim 1, wherein the releasable locking connection is comprised of a first locking means arranged at the control element and a second locking means arranged at the connecting member.

9. The high-pressure washer according to claim 8, wherein the connecting member comprises a control joint pin and wherein the control element comprises a control receiving slot for the control joint pin of the connecting member to accommodate said control joint pin, wherein the first locking means comprises projections at a rim of the control receiving slot, wherein the second locking means are engagement projections provided at the connecting member, wherein the projections at the rim of the control receiving slot hold the engagement projections by a clamping action in the mounting state of the component group.

10. The high-pressure washer according to claim 1, wherein the releasable locking connection is resilient such that the component group, by pushing the control element in the direction of the control rotation axis against the connecting member, is transferrable from the mounting state into the state of use.

11. The high-pressure washer according to claim 1, wherein the actuator is configured to actuate a component of the high-pressure washer that is movable relative to the housing.

12. The high-pressure washer according to claim 11, wherein the component of the high-pressure washer that is movable relative to the housing is resiliently supported with respect to the housing.

13. A method for assembly of the high-pressure washer according to claim 1, the method comprising:
inserting the component group, comprised of the control element and the connecting member, in the mounting state of the component group through an opening in the housing;
inserting the connecting member of the component group into the actuator while guiding the component group by the control element;
transferring the component group from the mounting state into the state of use by pushing the control element against the connecting member supported at the actuator; and
subsequently securing the control element at the housing of the high-pressure washer.

14. A high-pressure washer sprayer comprising:
a housing;
a pump with a motor, wherein the pump is configured to convey and pressurize a cleaning liquid in operation of the high-pressure washer, wherein the pump is movable relative to the housing;
an actuator rotatably supported about an actuator rotation axis;
a control element arranged rotatably at the housing and configured to control the actuator;
the control element and the actuator fixedly connected to each other for joint rotation by one or more universal joints;
wherein the actuator is configured to actuate the pump;
wherein the actuator is configured to actuate a pressure regulation of the pump, and wherein the actuator is arranged at the pump.

15. A method for assembly of the high-pressure washer sprayer according to claim 14, the method comprising:
inserting a component group, comprised of the control element and a connecting member arranged at the control element, in a mounting state of the component group through an opening in the housing;
inserting the connecting member of the component group into the actuator while guiding the component group by the control element;
transferring the component group from the mounting state into a state of use by pushing the control element against the connecting member supported at the actuator; and
subsequently securing the control element at the housing of the high-pressure washer.

16. A high-pressure washer sprayer comprising:
a housing;

an actuator rotatably supported about an actuator rotation axis, wherein the actuator rotation axis extends along an actuator rotation axis direction;

a control element arranged rotatably at the housing and configured to control the actuator;

the control element and the actuator fixedly connected to each other for joint rotation by a connection provided by at least one universal joint;

wherein the at least one universal joint comprises a first joint element and a second joint element, wherein the first joint element comprises a receptacle, and wherein the second joint element is supported in the receptacle of the first joint element and is pivotable relative to the first joint element;

wherein the receptacle of the first joint element and the at least one universal joint are configured as a whole such that a movement of the second joint element in the receptacle of the first joint element relative to the first joint element is enabled in a direction parallel to the actuator rotation axis direction without opening the connection provided by the at least one universal joint;

wherein the at least one universal joint is configured to enable a movement of the actuator relative to the control element along the actuator rotation axis direction without disengaging the connection provided by the at least one universal joint between the control element and the actuator.

17. A method for assembly of the high-pressure washer sprayer according to claim 16, the method comprising:

inserting a component group, comprised of the control element and a connecting member arranged at the control element, in a mounting state of the component group through an opening in the housing;

inserting the connecting member of the component group into the actuator while guiding the component group by the control element;

transferring the component group from the mounting state into a state of use by pushing the control element against the connecting member supported at the actuator; and subsequently securing the control element at the housing of the high-pressure washer.

\* \* \* \* \*